US012338521B2

(12) United States Patent
Selepack

(10) Patent No.: US 12,338,521 B2
(45) Date of Patent: Jun. 24, 2025

(54) METHOD AND COMPOSITION FOR RECYCLING ALUMINUM CONTAINERS

(71) Applicant: Golden Aluminum Company, Fort Lupton, CO (US)

(72) Inventor: Mark Selepack, Longmont, CO (US)

(73) Assignee: Golden Aluminum, Inc., Fort Lupton, CO (US)

( * ) Notice: Subject to any disclaimer, the term of this patent is extended or adjusted under 35 U.S.C. 154(b) by 0 days.

(21) Appl. No.: 18/114,855

(22) Filed: Feb. 27, 2023

(65) Prior Publication Data

US 2023/0227952 A1   Jul. 20, 2023

Related U.S. Application Data

(63) Continuation of application No. 15/338,056, filed on Oct. 28, 2016, now abandoned, which is a continuation of application No. 14/071,297, filed on Nov. 4, 2013, now abandoned.

(60) Provisional application No. 61/721,959, filed on Nov. 2, 2012.

(51) Int. Cl.
| C22F 1/047 | (2006.01) |
| B21B 1/46 | (2006.01) |
| B21B 3/00 | (2006.01) |
| C22C 21/00 | (2006.01) |
| C22C 21/06 | (2006.01) |
| C22C 21/08 | (2006.01) |

(52) U.S. Cl.
CPC ............... *C22F 1/047* (2013.01); *B21B 1/46* (2013.01); *B21B 1/463* (2013.01); *B21B 3/00* (2013.01); *C22C 21/00* (2013.01); *C22C 21/06* (2013.01); *C22C 21/08* (2013.01); *B21B 2003/001* (2013.01)

(58) Field of Classification Search
None
See application file for complete search history.

(56) References Cited

U.S. PATENT DOCUMENTS 5,833,775 A * 11/1998 Newton .................... C22F 1/04
  148/692
5,976,279 A * 11/1999 Selepack ................ C22F 1/047
  148/552

OTHER PUBLICATIONS

Caron, Ronald N. "Effects of Composition, Processing, and Structure on Properties of Nonferrous Alloys", ASM Handbook vol. 20: Materials Selection and Design, pp. 383-386. (Year: 1997).*

* cited by examiner

*Primary Examiner* — George Wyszomierski
*Assistant Examiner* — Janell C Morillo
(74) *Attorney, Agent, or Firm* — Sheridan Ross P.C.

(57) ABSTRACT

The present disclosure provides improved processes and compositions for continuously casting aluminum alloys. The resulting aluminum alloy sheet is useful for container body stock.

27 Claims, 2 Drawing Sheets

METHOD AND COMPOSITION FOR RECYCLING ALUMINUM CONTAINERS

CROSS REFERENCE TO RELATED APPLICATIONS

This application is a continuation of U.S. patent application Ser. No. 15/338,056, filed Oct. 28, 2016, which is a continuation of U.S. patent application Ser. No. 14/071,297, filed Nov. 4, 2013, now abandoned, which claims the benefit of U.S. Provisional Patent Application Ser. No. 61/721,959, filed Nov. 2, 2012.

FIELD

The disclosure relates generally to aluminum alloy sheet and methods for making aluminum alloy sheet. Specifically, the disclosure relates to methods and compositions for recycling aluminum alloy containers.

BACKGROUND

Aluminum beverage and food containers are generally made in two pieces, one piece forming the container sidewalls and bottom (referred to herein as a "container body") and a second piece forming the container top. Container bodies are formed by methods well known in the art. Generally, the container body is fabricated by forming a cup from a circular blank of aluminum sheet and then extending and thinning the sidewalls by passing the cup through a series of dies having progressively smaller bore size. This process is referred to as "drawing and ironing" the container body.

A common aluminum alloy used to produce container bodies is AA 3004, an alloy registered with the Aluminum Association. The aluminum alloy composition according to this standard includes the following constituents: (1) from 0.8 to 1.5 wt. % manganese; (2) from 0.8 to 1.3 wt. % magnesium; (3) 0.25 wt. % copper; (4) 0.70 wt. % iron; and (5) about 0.30 wt. % silicon. The balance of the alloy composition consists essentially of aluminum and incidental additional materials and impurities. The physical characteristics of AA 3004 are appropriate for drawing and ironing container bodies due primarily to the relatively low magnesium (Mg) and manganese (Mn) content of the alloy. A desirable characteristic of AA 3004 is that the amount of work hardening imparted to the aluminum sheet during the can making process is relatively minor.

A common aluminum alloy used to produce container ends is AA 5182. The aluminum alloy composition according to this standard includes the following constituents: (1) from 0.2 to 0.5 wt. % manganese; (2) from 4.0 to 5.0 wt. % magnesium; (3) 0.15 wt. % copper; (4) 0.35 wt. % iron; and (5) about 0.20 wt. % silicon. The balance of the alloy composition consists essentially of aluminum and incidental additional materials and impurities.

Aluminum alloy sheet is even more commonly produced by an ingot casting process. In this process, the aluminum alloy material is initially cast into an ingot, for example having a thickness of from about 20 to 30 inches. The ingot is then homogenized by heating to an elevated temperature, which is typically 1075° F. to 1150° F. (i.e., from about 579 to about 621° C.), for an extended period of time, such as from about 6 to 24 hours. The homogenized ingot is then hot rolled in a series of passes to reduce the thickness of the ingot. The hot rolled sheet is then cold rolled to the desired final gauge.

Despite the widespread use of ingot casting, there are numerous advantages to producing aluminum alloy sheet by continuously casting molten metal. In a continuous casting process, molten metal is continuously cast directly into a relatively long thin slab and the cast slab is then hot rolled and cold rolled to produce a finished product. However, not all alloys can be readily cast using a continuous casting process into aluminum sheet that is suitable for forming operations, such as for making drawn and ironed container bodies.

Moreover, aluminum can recycling, though desirable, can only constitute a minority fraction, typically from about 20 to 35 wt. %, of the melt composition used for body, end and tab stock. The remainder of the composition must be prime constituents.

There remains a need for a process which produces an aluminum alloy sheet having sufficient strength and formability characteristics to be easily made into drawn and ironed beverage containers. The sheet stock should have good strength and elongation, and the resulting container bodies should have low earing.

It would be desirable to have a continuous aluminum casting process in which a majority of the melt composition is derived from recycled aluminum containers.

SUMMARY

These and other needs are addressed by the various aspects, embodiments, and configurations of the present disclosure. The present disclosure is directed to aluminum alloy compositions for body stock that can be largely derived from used beverage containers and methods for making same.

The disclosed method and compositions can produce containers having reformed domes, which can allow lower properties for body stock without substantial changes to container buckle strengths. Containers generally require greater thickness reductions in can drawing than in conventional cans. Physical properties are selected carefully to avoid tear offs and neck wrinkles from can drawing.

The present disclosure can provide a number of advantages depending on the particular configuration. The aluminum alloy compositions disclosed herein can be derived largely from used beverage containers, thereby increasing levels of aluminum can recycle and reducing environmental impact.

These and other advantages will be apparent from the disclosure of the aspects, embodiments, and configurations contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "means" as used herein shall be given its broadest possible interpretation in accordance with 35 U.S.C. Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

Unless otherwise noted, all component or composition levels are in reference to the active portion of that component or composition and are exclusive of impurities, for example, residual solvents or by-products, which may be present in commercially available sources of such components or compositions.

All percentages and ratios are calculated by total composition weight, unless indicated otherwise.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

In accordance with an embodiment, an aluminum alloy composition is provided comprising from about 0.7 wt. % to about 1.2 wt. % manganese; from about 1.5 wt. % to about 2 wt. % magnesium; and aluminum.

Commonly, the aluminum alloy comprises from about 0.8 wt. % to about 0.9 wt. % manganese. Commonly, the aluminum alloy comprises from about 1.55 wt. % to about 1.65 wt. % magnesium.

The aluminum alloy can further comprise from about 0.2 wt. % to about 0.6 wt. % copper, and more commonly from about 0.25 wt. % to about 0.35 wt. % copper.

The aluminum alloy can further comprise from about 0.28 wt. % to about 0.45 wt. % iron, and more commonly from about 0.3 wt. % to about 0.4 wt. % iron.

The aluminum alloy can further comprise from about 0.1 wt. % to about 0.3 wt. % silicon, and more commonly from about 0.15 wt. % to about 0.25 wt. % silicon.

In accordance with another embodiment, an aluminum alloy composition is provided consisting essentially of:
a) manganese in an amount from about 0.7 wt. % to about 1.2 wt. %;
b) magnesium in an amount from about 1.5 wt. % to about 2 wt. %;
c) copper in amount from about 0.20 wt. % to about 0.60 wt. %;
d) iron in an amount from about 0.28 wt. % to about 0.45 wt. %;
e) silicon in an amount from about 0.1 wt. % to about 0.25 wt. %; and
the balance of the alloy composition consisting essentially of aluminum and incidental additional materials and impurities, wherein the incidental additional materials and impurities are commonly limited to about 0.05 wt. % each, more commonly limited to about 0.03 wt. % each, and even more commonly limited to about 0.01 wt. % each and the sum total of all incidental additional materials and impurities commonly does not exceed about 0.15 wt. %, more commonly does not exceed about 0.1 wt. %, and even more commonly does not exceed about 0.05 wt. %.

In accordance with another embodiment, an aluminum alloy composition is provided consisting essentially of:
a) manganese in an amount from about 0.8 wt. % to about 0.9 wt. %;
b) magnesium in an amount from about 1.55 wt. % to about 1.65 wt. %;
c) copper in an amount from about 0.25 wt. % to about 0.35 wt. %;
d) iron in an amount from about 0.3 wt. % to about 0.4 wt. %;
e) silicon in an amount from about 0.15 wt. % to about 0.25 wt. %; and
the balance of the alloy composition consisting essentially of aluminum and incidental additional materials and impurities, wherein the incidental additional materials and impurities are commonly limited to about 0.05 wt. % each, more commonly limited to about 0.03 wt. % each, and even more commonly limited to about 0.01 wt. % each and the sum total of all incidental additional materials and impurities commonly does not exceed about 0.15 wt. %, more commonly does not exceed about 0.1 wt. %, and even more commonly does not exceed about 0.05 wt. %.

The aluminum alloy described above is useful in continuous casting processes. The resulting aluminum alloy sheet is useful as body stock for production of containers.

In accordance with an embodiment, a process for producing aluminum alloy sheet is provided comprising:
a) hot rolling continuous cast aluminum alloy comprising from about 0.75 wt. % to about 1.2 wt. % manganese and from about 1.5 wt. % to about 2 wt. % magnesium;
b) hot mill annealing the continuous cast aluminum alloy;
c) intermediate annealing the continuous cast aluminum alloy; and
d) stabilize annealing the continuous cast aluminum alloy aluminum alloy sheet.

Commonly, the hot rolling of the continuous cast aluminum alloy is conducted in the absence of heating of the continuous cast aluminum alloy.

The process can further comprise cold rolling the continuous cast aluminum alloy in one or two passes between the steps of hot mill annealing and intermediate annealing.

The process can further comprise cold rolling the continuous cast aluminum alloy in one or two passes between the steps of intermediate annealing and stabilize annealing.

In the process, the aluminum sheet has physical properties useful for container body stock.

The aluminum alloy used in the process can comprise from about 0.8 wt. % to about 0.9 wt. % manganese.

The aluminum alloy used in the process can comprise from about 1.55 wt. % to about 1.65 wt. % magnesium.

The aluminum alloy used in the process can further comprise from about 0.2 wt. % to about 0.6 wt. % copper, and more commonly from about 0.25 wt. % to about 0.35 wt. % copper.

The aluminum alloy used in the process can further comprise from about 0.28 wt. % to about 0.45 wt. % iron, and more commonly from about 0.3 wt. % to about 0.4 wt. % iron.

The aluminum alloy used in the process can further comprise from about 0.1 wt. % to about 0.3 wt. % silicon, and more commonly from about 0.15 wt. % to about 0.25 wt. % silicon.

The aluminum alloy used in the process can consist essentially of:
a) manganese in an amount from about 0.7 wt. % to about 1.2 wt. %;
b) magnesium in an amount from about 1.5 wt. % to about 2 wt. %;
c) copper in amount from about 0.20 wt. % to about 0.60 wt. %;
d) iron in an amount from about 0.28 wt. % to about 0.45 wt. %;
e) silicon in an amount from about 0.1 wt. % to about 0.25 wt. %; and
the balance of the alloy composition consisting essentially of aluminum and incidental additional materials and impurities, wherein the incidental additional materials and impurities are commonly limited to about 0.05 wt. % each, more commonly limited to about 0.03 wt. % each, and even more commonly limited to about 0.01 wt. % each and the sum total of all incidental additional materials and impurities commonly does not exceed about 0.15 wt. %, more commonly does not exceed about 0.1 wt. %, and even more commonly does not exceed about 0.05 wt. %.

The aluminum alloy used in the process can consist essentially of:
a) manganese in an amount from about 0.8 wt. % to about 0.9 wt. %;
b) magnesium in an amount from about 1.55 wt. % to about 1.65 wt. %;
c) copper in an amount from about 0.25 wt. % to about 0.35 wt. %;
d) iron in an amount from about 0.3 wt. % to about 0.4 wt. %;
e) silicon in an amount from about 0.15 wt. % to about 0.25 wt. %; and
the balance of the alloy composition consisting essentially of aluminum and incidental additional materials and impurities, wherein the incidental additional materials and impurities are commonly limited to about 0.05 wt. % each, more commonly limited to about 0.03 wt. % each, and even more commonly limited to about 0.01 wt. % each and the sum total of all incidental additional materials and impurities commonly does not exceed about 0.15 wt. %, more commonly does not exceed about 0.1 wt. %, and even more commonly does not exceed about 0.05 wt. %.

In accordance with an embodiment, a process for producing aluminum alloy sheet is provided comprising:
a) hot rolling continuous cast aluminum alloy in the absence of heating of the continuous cast aluminum alloy, wherein the alloy comprises manganese in an amount from about 0.7 wt. % to about 1.2 wt. %, magnesium in an amount from about 1.5 wt. % to about 2 wt. %, copper in amount from about 0.20 wt. % to about 0.60 wt. %, iron in an amount from about 0.28 wt. % to about 0.45 wt. %, silicon in an amount from about 0.1 wt. % to about 0.25 wt. %, and the balance of the alloy composition consisting essentially of aluminum and incidental additional materials and impurities, wherein the incidental additional materials and impurities are limited to about 0.05 wt. % each, and the sum total of all incidental additional materials and impurities does not exceed about 0.15 wt. %;
b) hot mill annealing the continuous cast aluminum alloy;
c) cold rolling the continuous cast aluminum alloy in one or two passes;
d) intermediate annealing the continuous cast aluminum alloy;
e) cold rolling the continuous cast aluminum alloy in one or two passes; and
f) stabilize annealing the continuous cast aluminum alloy to form aluminum alloy sheet.

The alloy compositions can be formed in part from scrap metal material, such as plant scrap, container scrap and consumer scrap. An alloy composition can be formed with at least about 75%, more commonly at least about 80%, more commonly at least about 85%, more commonly at least about 90% and more commonly at least about 95% total scrap. Aluminum prime can be added to dilute components present in excess (e.g., decrease magnesium content by dilution), and component prime can be added to supplement components (e.g., manganese prime can be added to increase manganese content to desired levels).

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate common and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Figure 1:
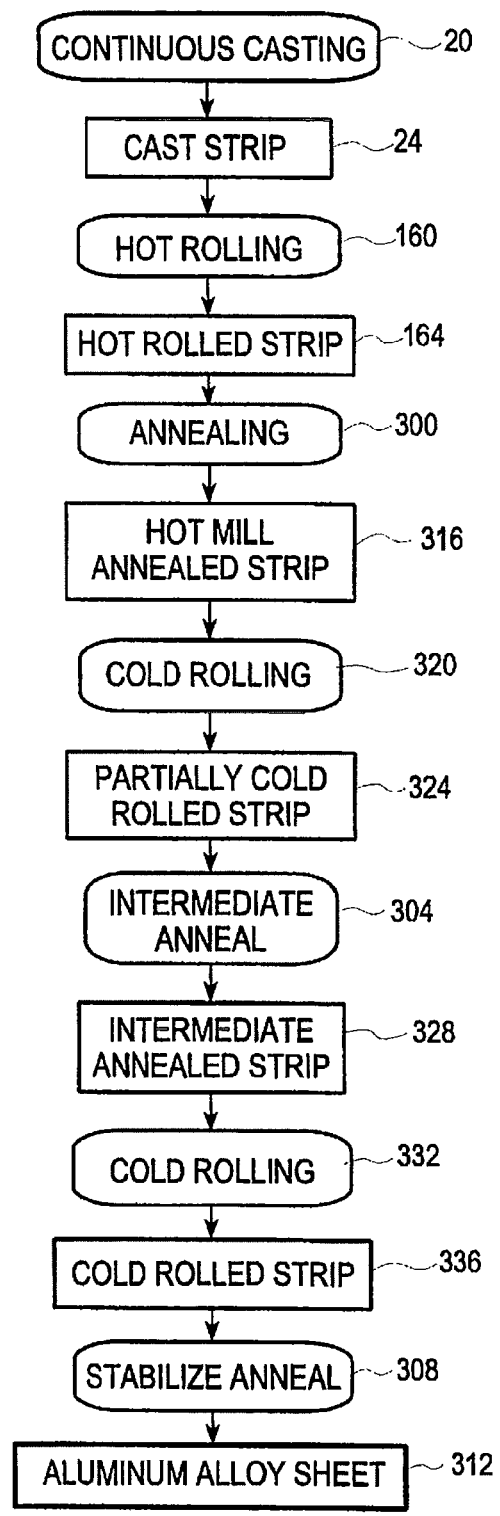
FIG. 1 depicts a first aluminum alloy sheet manufacturing process according to an embodiment.

The various continuous casting processes of the present disclosure can produce aluminum alloy sheet having high strength, low earing, highly desirable forming properties, and/or an equiaxed/finer grain structure. As used herein, "continuous casting" refers to a casting process that produces a continuous strip as opposed to a process producing a rod or ingot. By way of example, the continuous casting processes can include optionally heating the cast strip in front of the last hot mill stand (i.e., between the caster and first hot mill stand or between hot mill stands). The heater can reduce the load on the hot mill stands, thereby permitting greater reductions of the cast strip in the hot mill, provide a hot milled strip having an equiaxed grain structure, and/or facilitate self-annealing (i.e., recrystallization) of the unheated strip when the unheated strip is cooled, thereby obviating, in many cases, the need for a hot mill anneal. The increased hot mill reductions can eliminate one or more cold mill passes. Alternatively, one or more hot mill steps can be conducted in the absence of heating. The processes can further include continuous intermediate annealing of the cold rolled strip. The continuous anneal can provide more uniform mechanical properties for the aluminum alloy sheet, a finer grain size, controllable mechanical properties using a stabilizing anneal, and significant savings in operating and alloy costs and improvements in production capacity. The intermediate anneal is particularly useful for body stock. Finally, the continuous casting processes can include stabilization or back annealing of the cold rolled strip.

The aluminum alloy sheet produced in accordance with the various embodiments can maintain sufficient strength and formability properties while having a relatively thin gauge. This is especially important when the aluminum alloy sheet is utilized in body stock for making drawn and ironed containers. The trend in the can making industry is to use thinner aluminum alloy sheet for the production of drawn and ironed containers, thereby producing a container containing less aluminum and having a reduced cost. However, to use thinner gauge aluminum sheet, the aluminum alloy sheet must still have the required physical characteristics. Surprisingly, continuous casting processes have been discovered which produce an aluminum alloy sheet that can meet industry standards for body stock, particularly when utilized with the alloys of the present disclosure.

The aluminum alloy composition for container bodies commonly includes the following constituents:

(1) with a minimum of at least about 0.7 wt. %, more commonly with a minimum of at least about 0.75 wt. %, more commonly with a minimum of at least about 0.8 wt. %, and even more commonly with a minimum of at least about 0.85 wt. % and with a maximum of at most about 1.2 wt. %, more commonly with a maximum of at most about 1.1 wt. %, more commonly with a maximum of at most about 1 wt. %, and even more commonly with a maximum of at most about 0.9 wt. % manganese;

(2) with a minimum of at least about 1.5 wt. %, more commonly with a minimum of at least about 1.51 wt. %, more commonly with a minimum of at least about 1.52 wt. %, more commonly with a minimum of at least about 1.53 wt. %, more commonly with a minimum of at least about 1.54 wt. %, and even more commonly with a minimum of at least about 1.55 wt. % and with a maximum of at most about 2 wt. %, more commonly with a maximum of at most about 1.9 wt. %, more commonly with a maximum of at most about 1.8 wt. %, more commonly with a maximum of at most about 1.7 wt. %, more commonly with a maximum of at most about 1.65 wt. %, and even more commonly with a maximum of at most about 1.6 wt. % magnesium;

(3) with a minimum of at least about 0.2 wt. %, more commonly with a minimum of at least about 0.25 wt. % and even more commonly with a minimum of at least about 0.3 wt. % and with a maximum of at most about 0.6 wt. %, more commonly with a maximum of at most about 0.5 wt. %, more commonly with a maximum of at most about 0.4 wt. % and even more commonly with a maximum of at most about 0.35. % copper;

(4) with a minimum of at least about 0.28 wt. %, more commonly with a minimum of at least about 0.30 wt. %, and even more commonly with a minimum of at least about 0.32 wt. % and with a maximum of at most about 0.45 wt. %, more commonly with a maximum of at most about 0.4 wt. % and even more commonly with a maximum of at most about 0.35 wt. % iron; and (5) with a minimum of at least about 0.1 wt. %, more commonly with a minimum of at least about 0.15 wt. % and with a maximum of at most about 0.3 wt. %, more commonly with a maximum of at most about 0.25 wt. %, and even more commonly with a maximum of at most about 0.2 wt. % silicon.

The balance of the alloy composition consists essentially of aluminum and incidental additional materials and impurities. The incidental additional materials and impurities are commonly limited to about 0.05 wt. % each, more commonly limited to about 0.03 wt. % each, and even more commonly limited to about 0.01 wt. % each and the sum total of all incidental additional materials and impurities commonly does not exceed about 0.15 wt. %, more commonly does not exceed about 0.1 wt. %, and even more commonly does not exceed about 0.05 wt. %.

A particularly useful aluminum alloy composition for body stock includes the following constituents:

(1) Manganese in an amount from about 0.8 wt. % to about 0.9 wt. %;

(2) Magnesium in an amount from about 1.55 wt. % to about 1.65 wt. %;

(3) Copper in an amount from about 0.25 wt. % to about 0.35 wt. %;

(4) Iron in an amount from about 0.3 wt. % to about 0.4 wt. %; and (5) Silicon in an amount from about 0.15 wt. % to about 0.25 wt. %.

The balance of the alloy composition commonly consists essentially of aluminum and incidental additional materials and impurities. The incidental additional materials and impurities are commonly limited to about 0.05 wt. % each, more commonly limited to about 0.03 wt. % each, and even more commonly limited to about 0.01 wt. % each and the sum total of all incidental additional materials and impurities commonly does not exceed about 0.15 wt. %, more commonly does not exceed about 0.1 wt. %, and even more commonly does not exceed about 0.05 wt. %.

The above compositions result in alloys that can be effectively formed into container bodies having desirably low tear offs, while maintaining desired physical qualities such as buckle strength. Commonly, containers formed from the above alloys have acceptably low decreases in strength when heated, such as in an oven to cure decorated containers.

The above compositions can be derived from a melt of conventional can bodies or used beverage containers ("UBCs") including the following constituents:

(1) with a minimum of at least about 0.45 wt. %, more commonly with a minimum of at least about 0.50 wt. % and with a maximum of at most about 1.1 wt. %, more commonly with a maximum of at most about 0.95 wt. %, more commonly with a maximum of at most about 0.80 wt. %, and even more commonly with a maximum of at most about 0.70 wt. % manganese;

(2) with a minimum of at least about 1.2 wt. %, more commonly with a minimum of at least about 1.25 wt. %, more commonly with a minimum of at least about 1.3 wt. %, more commonly with a minimum of at least about 1.35 wt. %, and even more commonly with a minimum of at least about 1.4 wt. % and with a maximum of at most about 2 wt. %, more commonly with a maximum of at most about 1.95 wt. %, more commonly with a maximum of at most about 1.9 wt. %, more commonly with a maximum of at most about 1.85 wt. %, and even more commonly with a maximum of at most about 1.8 wt. % magnesium;

(3) with a minimum of at least about 0.05 wt. %, more commonly with a minimum of at least about 0.1 wt. % and even more commonly with a minimum of at least about 0.15 wt. % and with a maximum of at most about 0.5 wt. %, more commonly with a maximum of at most about 0.4 wt. % and even more commonly with a maximum of at most about 0.3 wt. % copper;

(4) with a minimum of at least about 0.2 wt. %, more commonly with a minimum of at least about 0.3 wt. % and with a maximum of at most about 0.7 wt. %, more commonly with a maximum of at most about 0.6 wt. % and even more commonly with a maximum of at most about 0.5 wt. % iron; and (5) with a minimum of at least about 0.1 wt. %, more commonly with a minimum of at least about 0.15 wt. % and with a maximum of at most about 0.5 wt. %, more commonly with a maximum of at most about 0.45 wt. %, and even more commonly with a maximum of at most about 0.35 wt. % silicon.

The balance of the melt composition consists essentially of aluminum and incidental additional materials and impurities. The incidental additional materials and impurities are commonly limited to about 0.05 wt. % each, more commonly limited to about 0.03 wt. % each, and even more commonly limited to about 0.01 wt. % each and the sum total of all incidental additional materials and impurities commonly does not exceed about 0.15 wt. %, more commonly does not exceed about 0.1 wt. %, and even more commonly does not exceed about 0.05 wt. %.

To alter this composition to produce container body stock, prime is added such that the final melt composition typically is no more than about 25 wt. %, more typically no more than about 20 wt. %, more typically no more than about 15 wt. % prime, more typically no more than about 10 wt. % prime, and even more typically no more than about 5 wt. % prime, with the balance being the molten composition from recycled containers or used beverage containers ("UBCs").

A first embodiment of a continuous casting process is depicted in FIG. 1. This process is particularly useful for forming body stock for container manufacture.

Referring to FIG. 1, a melt of the aluminum alloy composition is formed and continuously cast 20 to form a cast strip 24. The continuous casting process can employ a variety of continuous casters, such as a belt caster or a roll caster.

The alloy composition can be formed in part from scrap metal material, such as plant scrap, container scrap and consumer scrap. Commonly, the alloy composition is formed with at least about 75%, more commonly at least about 80%, more commonly at least about 85%, more commonly at least about 90% and more commonly at least about 95% total scrap. Aluminum prime is typically added to dilute e.g., magnesium content (by dilution), and e.g., manganese prime is added to increase e.g., manganese content to desired levels.

To form the melt, the metal is charged into a furnace and heated to a temperature of about 1385° F. (i.e., about 752° C.) (i.e., above the melting point of the feed material) until the metal is thoroughly melted. The alloy is treated to remove materials such as dissolved hydrogen and non-metallic inclusions which would impair casting of the alloy and the quality of the finished sheet. The alloy can also be filtered to further remove non-metallic inclusions from the melt. The melt is then cast through a nozzle and discharged into the casting cavity. The nozzle can include a long, narrow tip to constrain the molten metal as it exits the nozzle. The nozzle tip size commonly ranges from about 10 to about 25 mm, more commonly from about 12 to about 22 mm, more commonly from about 16 to about 19 mm, and even more commonly about 19 mm.

The melt exits the tip and is received in the casting cavity which is formed by opposing pairs of rotating chill blocks. The metal cools and solidifies as it travels through the casting cavity due to heat transfer to the chill blocks. At the end of the casting cavity, the chill blocks, which are on a continuous web, separate from the cast strip 24. The blocks travel to a cooler where the treated chill blocks are cooled before being reused.

The cast temperature of the cast strip 24 exiting the block caster commonly exceeds the recrystallization temperature of the cast strip. The cast output temperature (i.e., the output temperature as the cast strip exits the caster) commonly ranges from about 800 to about 1050° F. (i.e., about 426 to about 565° C.) and more commonly from about 900 to about 1050° F. (i.e., about 482 to about 565° C.).

The cast strip 24 is hot rolled 160 to form a hot rolled strip 164. In the hot rolling step 160, the cast strip 24 is commonly reduced in thickness by an amount of at least about 50%, more commonly at least about 55%, and even more commonly at least about 68% but no more than about 85%, more commonly no more than about 90%, and even more commonly no more than about 95% to a gauge commonly ranging from about 0.06 to about 0.12 inches, more commonly from about 0.085 to about 0.110 inches, and even more commonly from about 0.06 to about 0.09 inches. The lowering of the gauge of the hot rolled strip to the range of about 0.06 to about 0.09 can provide further reductions in the tested earing of the sheet 312, improved surface grain size, and increased strength properties.

The hot rolled strip 164 is hot mill annealed 300 in a batch or continuous heater to form a hot mill annealed strip 316. The continuous heater can be a gas-fired, infrared, or an induction heater.

The duration of the anneal depends upon the type of furnace employed, i.e., on how long it takes to achieve the desired metal temperature. The strip is commonly intermediate annealed at a minimum temperature of about 725° F. (i.e., about 385° C.) and more commonly about 775° F. (i.e., about 413° C.), and commonly at a maximum temperature of about 900° F. (i.e., about 482° C.), more commonly of no more than about 850° F. (i.e., about 454° C.), and more commonly of no more than about 825° F. (i.e., about 441° C.).

The hot mill annealed strip 316 is allowed to cool and then subjected to cold rolling 320 to form a partially cold rolled strip 324. In the cold rolling step 320, the thickness of the strip 316 is commonly reduced by at least about 50%, more commonly at least about 60%, but no more than about 75% and more commonly no more than about 65%. Commonly, the reduction to intermediate gauge is performed in 1 to 2 passes. The minimum gauge of the partially cold rolled strip 324 is commonly about 0.02 inches and even more commonly about 0.025 inches, and the maximum gauge is commonly about 0.04 inches and even more commonly about 0.035 inches. In one embodiment, the gauge of the partially cold rolled strip 324 is about 0.03 inches. In one application, the cold rolling reduction upstream of intermediate annealing is maintained at no more than 73%. This intermediate gauge is based on the desired final gauge.

The partially cold rolled strip 324 is intermediate annealed 304 to form an intermediate annealed strip 328. Intermediate annealing commonly removes tensile and yield strength increases from hot mill reductions. The minimum temperature of the anneal 304 commonly is about 710° F. (i.e., about 377° C.), more commonly about 720° F. (i.e., about 382° C.), and even more commonly about 725° F. (i.e., about 385° C.). The maximum temperature of the anneal 304 is commonly about 850° F. (i.e., about 454° C.), more commonly about 800° F. (i.e., about 427° C.), and even more commonly about 750° F. (i.e., about 399° C.).

The annealed strip 328 can be cooled, such as by quenching, and/or a nitrogen purge, after annealing.

After cooling, the annealed strip 328 is subjected to cold rolling 332 to form cold rolled strip 336. Commonly, the reduction to final gauge by cold rolling 332 is performed in 1 to 2 passes. As will be appreciated, a greater degree of reduction upstream of intermediate annealing can reduce required cold rolling reductions downstream to maintain desired physical properties and to achieve the desired final gauge. The common reduction in thickness of the annealed strip 328 is at least about 30%, more commonly at least about 40%, more commonly at least about 50%, and even more commonly at least about 55% but no more than about 90%, more commonly no more than about 80%, more commonly no more than about 75%, and even more commonly no more than about 70%, and commonly about 65% reduction to a gauge ranging from about 0.005 to about 0.013 inches, even more commonly ranging from about 0.009 to about 0.013 inches.

Intermediate annealing and subsequent cold work help control final earing.

The cold rolled strip 336 is optionally subjected to a stabilize anneal 308 to form aluminum alloy sheet 312 with desired final mechanical properties. Stabilize annealing can protect a dome formed in subsequent container-forming processes from orange peeling and produce desired physical properties. Stabilize annealing commonly removes or reduces tensile and yield strengths by approximately 5 ksi. A batch or continuous heater can be employed in the stabilized anneal 308. The cold rolled strip 336 is commonly stabilize annealed 308 at a minimum temperature of at least about 300° F. (i.e., about 146° C.) and more commonly at least about 325° F. (i.e., about 162° C.), and commonly at a maximum temperature of no more than about 500° F. (i.e., about 260° C.), more commonly of no more than about 450° F. (i.e., about 232° C.), and even more commonly of no more than about 400° F. (i.e., about 204° C.). The even more common temperature range is from about 300 to about 400° F. (i.e., from about 146 to about 204° C.).

The aluminum alloy sheet 312 has properties that are particularly useful for body stock. When the aluminum alloy sheet 312 is to be used as body stock, the alloy sheet commonly has a final yield strength of at least about 32 ksi and more commonly at least about 34 ksi, and even more commonly at least about 36 ksi but commonly no more than about 43 ksi, more commonly no more than about 41 ksi, and even more commonly no more than about 39 ksi. The final tensile strength commonly is at least about 38 ksi, more commonly at least about 39 ksi, more commonly at least about 40 ksi, and even more commonly at least about 41 ksi but commonly no more than about 46 ksi, more commonly no more than about 45 ksi, more commonly no more than about 44 ksi, and even more commonly no more than about 43 ksi. The aluminum alloy sheet 312 should have a final elongation of at least about 3% and more commonly at least about 4%. In an embodiment, the aluminum alloy sheet 312 should have a final elongation of no more than about 7% and more commonly no more than about 6%.

To produce acceptable drawn and ironed container bodies, aluminum alloy sheet 312 used as body stock should have a low earing percentage. Commonly, the aluminum alloy sheet 312, according to the present disclosure, has a tested earing of no more than about 1.5% and more commonly no more than about 1% and most commonly no more than about 0.75%, based on testing of a 55 mm drawn cup using a Tinius Olsen Ductomatic.

Container bodies fabricated from the aluminum alloy sheet 312 of the embodiment of the present disclosure have relatively high strengths. The container bodies have a minimum dome reversal strength of at least about 90 psi, commonly at least about 93 psi and more commonly at least about 96 psi at current commercial thicknesses. The column strength of the container bodies commonly is at least about 230 psi and more commonly at least about 250 psi.

In accordance with yet another embodiment of the present disclosure, a method is provided for fabricating an aluminum alloy sheet in which the initial cold rolling step is performed in the absence of an annealing step after hot rolling and before the first cold rolling step and/or in which the reductions in strip thickness between intermediate anneals and after the last intermediate anneal are maintained at or below a specified level to avoid full hard conditions. The first intermediate annealing step is commonly performed after the first cold rolling step, and the second intermediate annealing step is performed after the subsequent cold rolling step. The method generally includes the steps of: (i) forming an aluminum alloy melt; (ii) continuously casting the alloy melt to form a cast strip; (iii) optionally heating the cast strip before hot rolling; (iv) hot rolling the cast strip to form a hot rolled strip (typically having a gauge ranging from about 0.06 to about 0.090 inches); (v) cooling the hot rolled strip to a temperature below the recrystallization temperature of the hot rolled strip; (vi) cold rolling the hot rolled strip to form a partially cold rolled strip (typically having a gauge ranging from about 0.025 to about 0.035 inches); (vii) annealing, commonly in a batch anneal, the partially cold rolled strip to form a first intermediate annealed strip; and (viii) further cold rolling the first intermediate cold mill strip to form a further cold rolled strip; (ix) optionally further annealing, either in a continuous or a batch anneal, the further cold rolled strip to form a second intermediate annealed strip; and (x) forming the second intermediate annealed strip into the aluminum alloy sheet. As desired, after annealing step (ix) the second intermediate annealed strip can be further cold rolled and/or stabilize annealed to form the aluminum alloy sheet.

The elimination of the annealing step directly after the hot rolling step and the performance of two separate annealing steps only after cold rolling steps offer a number of advantages, particularly when the resulting sheet is employed in the fabrication of containers such as cans. The containers produced from the aluminum alloy sheet can have a reduced degree of earing and a reduction in the occurrence of split flanges and sidewalls in containers produced from the sheet. The container dimensions can be within an acceptable tolerance of the specified container dimensions. Containers produced from the sheet can have a significantly reduced incidence of bulging in the container necked/flange sidewalls compared to containers produced from aluminum alloy sheet having different compositions and/or produced by other processes. It is believed that the alloy sheet of the present disclosure typically experiences less work hardening during fabrication of containers from the sheet than other continuously cast alloys and comparable to direct chill or ingot cast sheet. For instance, work hardening can occur when cans come off the canmaker and are heated to elevated temperatures to dry the paint on the can. As noted, the reductions in strip thickness between the two intermediate annealing steps and after the final intermediate annealing step are each maintained below the level required for the strip to realize a full hard state. The annealing of a thinner gauge of sheet (i.e., annealing which is performed only after cold rolling steps) compared to annealing in previous embodiments (i.e., which is performed after casting and before hot rolling and again after cold rolling) increases the amount of reduction which can be satisfactorily achieved with each cold roll pass and thus can eliminate one or more cold rolling passes relative to previous embodiments. Finally, the physical properties of the sheet of this embodiment can experience significantly less reduction during fabrication relative to the reduction in physical properties of other alloy sheets during fabrication. In canmaking applications, for example, existing continuously cast alloy sheets can suffer a reduction in physical properties of as much as 4 lbs or more in buckle strength and 20 lbs or more in column strength, after heating the sheet in deco/IBO ovens.

The aluminum alloy sheet produced by the above-described method can have a number of desirable properties, including those mentioned above.

Figure 2:
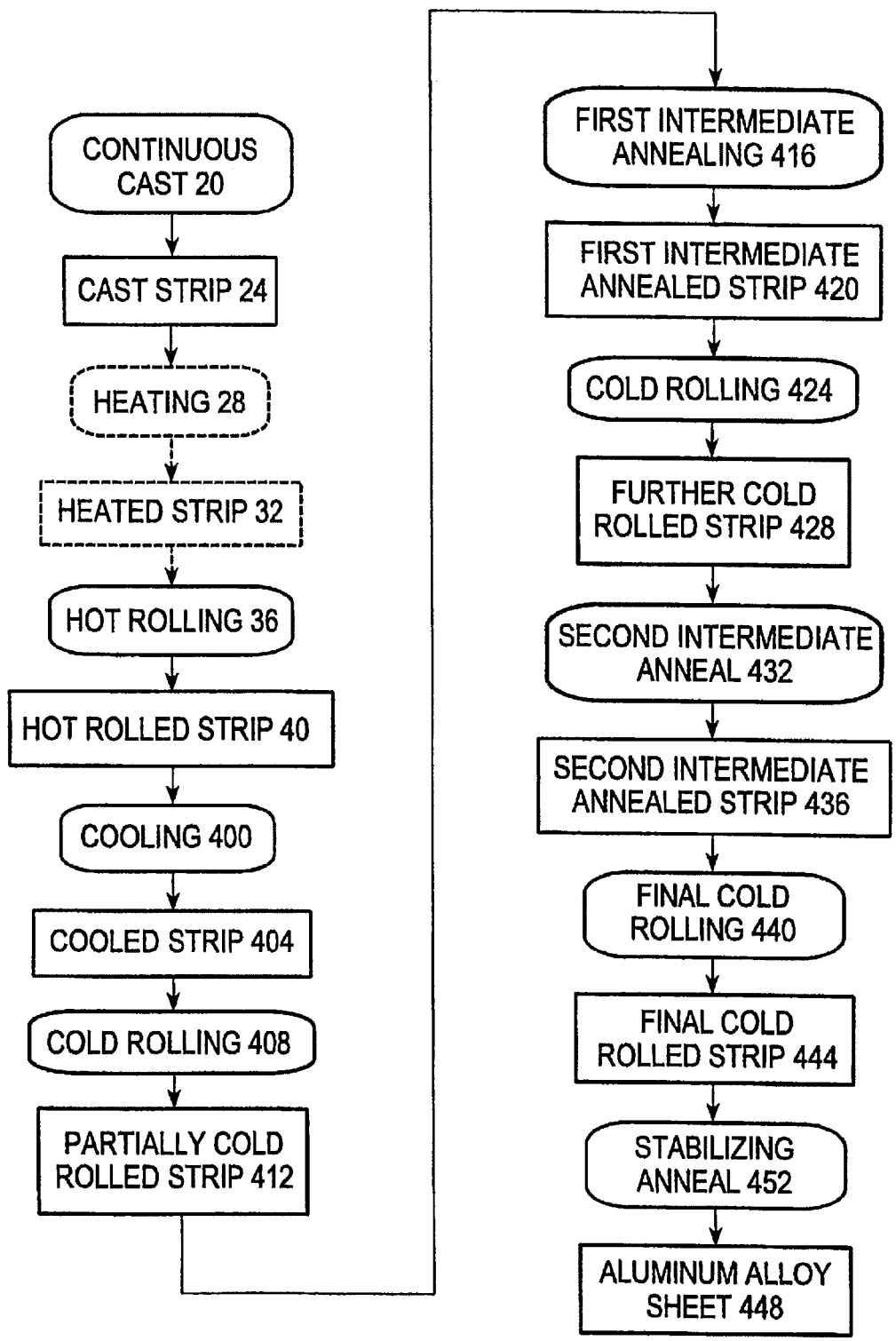
FIG. 2 depicts a second aluminum alloy sheet manufacturing process according to an embodiment.

With continuing reference to FIG. 2, in the process the continuously cast strip 24 is produced in a casting cavity having a common tip diameter ranging from about 17 to about 19 mm and subjected to hot rolling as described previously to form the hot rolled strip 40. The hot mill commonly reduces the thickness of the cast strip in one or more passes by at least about 70% and more commonly by at least about 80%. The gauge of the cast strip commonly ranges from about 0.50 inches to about 0.95 inches while the gauge of the hot rolled strip ranges from about 0.060 to about 0.140 inches. The hot rolled strip commonly exits the hot mill at a temperature ranging from about 500 to about 750° F. (i.e., from about 260 to about 399° C.). It is common that the total reduction of the cast strip be realized in two to three passes with two passes being even more common.

As an optional step, the continuously cast strip 24 can be heated 28 as described above to form a heated strip 32. The heated strip 32 is then hot rolled 36 to form the hot rolled strip 40.

The hot rolled strip 40 passes directly to a cooling step 400 before the first cold rolling step to form a cooled strip 404. The hot rolled strip 40 is allowed to cool before cold rolling to a temperature less than the recrystallization temperature of the hot rolled strip. Commonly, the hot rolled strip 40 is allowed to cool for a sufficient period of time to produce a hot rolled sheet having a temperature ranging from about 75 to about 140° F. (i.e., from about 24 to about 60° C.). Generally, the hot rolled strip 40 is cooled for about 48 hours. The strip is commonly not quenched or otherwise solution heat treated.

In the first cold rolling step 408, the cooled strip 404 is passed between cold rollers, as necessary, to form a cold rolled strip 412 at an intermediate gauge. Commonly, the intermediate gauge ranges from about 0.020 to about 0.055 inches, more commonly from about 0.025 to about 0.045 and more commonly from about 0.030 to about 0.035 inches. The total reduction commonly is less than about 65% and more commonly ranges from about 20% to about 45% and more commonly from about 25 to about 40% through the cold rollers. It is common that the total sheet reduction be realized in two passes or less, with a single pass being even more common.

When the desired intermediate anneal gauge is reached following the first cold rolling step 408, the cold rolled strip 412 is breakdown or first intermediate annealed 416 in a batch anneal oven to form a first intermediate annealed strip 420 and reduce the residual cold work and lower the earing of the aluminum sheet. The first intermediate anneal 416 is commonly a heat soak anneal. Commonly, the strip 412 is intermediate annealed at a minimum temperature of at least about 500° F. (i.e., about 260° C.), more commonly of at least about 600° F. (i.e., about 316° C.), and more commonly at a minimum of at least about 650° F. (i.e., about 343° C.), and at a maximum temperature commonly of no more than about 850° F. (i.e., about 454° C.), more commonly of no more than about 800° F. (i.e., about 427° C.), and even more commonly of no more than about 775° F. (i.e., about 413° C.). The even more common annealing temperature is about 725° F. (i.e., about 385° C.). The annealing soak time is commonly a minimum of at least about 0.5 hours and is more commonly a minimum of at least about 1 hour with about 3 hours being even more common.

Commonly, the first intermediate annealed strip 420 is allowed to cool to a temperature less than the recrystallization temperature of the strip prior to additional cold rolling steps. The common temperature for cold rolling ranges from about 75 to about 140° F. (i.e., from about 24 to about 60° C.). The cooling time typically is 48 hours. As will be appreciated, the strip can be force cooled in a significantly shorter time by injecting nitrogen gas into the batch anneal oven to reduce the sheet temperatures to about 250° F. (i.e., about 121° C.). However, the strip is commonly not subjected to solution heat treatment.

After the strip 420 has cooled to ambient temperature, a further cold rolling step 424 is used, as necessary, to form a further cold rolled strip 428 having a smaller intermediate gauge. Commonly, the intermediate gauge ranges from about 0.015 to about 0.040 inches and more commonly from about 0.030 to about 0.035 inches. It is common that the thickness of the strip be reduced in total by less than 73%, more commonly by no more than about 71%, and more commonly by no more than about 70%. It is common that the total reduction be realized in two passes or less, with a single pass being common.

By maintaining all reductions between anneal points below the level necessary to realize full hard conditions (i.e., about 73% or higher), the earing can be maintained at relatively low levels. As will be appreciated, the earing of a strip is directly related to the amount of cold work the strip experiences. The reduction in the final cold rolling step is selected to realize the desired strength properties in the final aluminum alloy sheet.

The further cold rolled strip 428 is annealed a second time or second intermediate annealed 432, commonly in a continuous or batch anneal oven, to form a second intermediate annealed strip 436. The anneal can be a heat soak anneal or a continuous anneal, such as in an induction heater. Commonly, the annealing temperature for a batch heater ranges from about 600 to about 900° F. (i.e., from about 316 to about 482° C.), more commonly from about 650 to about 750° F. (i.e., from about 343 to about 399° C.). The even more common temperature is about 705° F. (i.e., about 374° C.). The annealing or soak time commonly is at least about 0.5 hrs and more commonly about 2 hrs, with about 3 hrs being even more common. Commonly the annealing temperature for a continuous heater ranges from about 700 to about 1050° F. (i.e., from about 371 to about 566° C.), with about 700° F. (i.e., about 371° C.) being more common. The annealing or soak time commonly ranges from about 2 seconds to about 2.5 minutes and more commonly from about 3 to about 10 seconds.

Commonly, the second intermediate annealed strip 436 is allowed to cool to a temperature less than the recrystallization temperature of the strip prior to a final cold rolling step 440. The common temperature for cold rolling ranges from about 75 to about 140° F. (i.e., from about 24 to about 60° C.). The cooling time typically is about 48 hours. As will be appreciated, the strip can be force cooled in a significantly shorter time by injecting the nitrogen gas into the batch annealing oven to reduce the sheet temperatures to about 250° F. (i.e., about 121° C.). However, the strip is commonly not subjected to solution heat treatment.

Finally, a final cold rolling step 440 is used to impart the final properties to a final cold rolled strip 444. Generally, the final gauge is specified and therefore the desired percent reduction for the final cold rolling step 440 is determined. The percent reductions in the other cold rolling steps and the hot rolling step are back calculated based upon the final desired gauge. As noted, the back calculation is performed such that the total cold mill reductions before the first intermediate annealing step 416, between the first and second intermediate annealing steps 416 and 432, and after the second intermediate annealing step 432 are each less than the level required to realize full hard conditions.

In a common embodiment, the total reduction to final gauge is from about 40% to 70%, more commonly from about 50% to about 60% and even more commonly from about 55% to about 65% in the step. Commonly, the reduction is realized through a single pass. When the strip is fabricated for drawn and ironed container bodies, the final gauge can be, for example, from about 0.010 to about 0.014 inches. The final cold rolling step is commonly conducted at a temperature ranging from about 75 to about 120° F. (i.e., from about 24 to about 49° C.) (incoming strip temperature).

The process can optionally include a stabilizing anneal step 452 to impart desired properties to the aluminum alloy sheet 448. The stabilizing anneal step 452 can be performed in either a batch or continuous heater. As noted above, the continuous heater can include an induction heater. The temperature for the stabilizing anneal commonly ranges from about 248 to about 401° F. (i.e., from about 120 to about 205° C.) and more commonly from about 293 to about 347° F. (i.e., from about 145 to about 175° C.) (for a batch heater) and commonly ranges from about 293 to about 500° F. (i.e., from about 145 to about 260° C.) and more commonly from about from about 392 to about 455° F. (i.e., 200 to about 235° C.) (for a continuous heater).

The aluminum alloy sheet 448 produced from the above-noted alloy by this process is especially useful for drawn and ironed container bodies. When the aluminum alloy sheet is to be fabricated into drawn and ironed container bodies, the alloy sheet commonly has an as-rolled yield strength of at least about 32.5 ksi, more commonly at least about 33.5 ksi, and even more commonly at least about 34 ksi. The maximum as-rolled yield strength is commonly no more than about 38.5 ksi, more commonly no more than about 37.5 ksi, and even more commonly no more than about 37 ksi. Commonly, the after-bake yield strength is at least about 32.5 ksi, more commonly at least about 33.5 ksi, and even more commonly is at least about 34.0 ksi, and commonly not greater than about 38.5 ksi, more commonly than about 37.5 ksi, and even more commonly than about 37 ksi. The aluminum alloy sheet commonly has an as-rolled ultimate tensile strength of at least about 36 ksi, more commonly at least about 37 ksi and even more commonly at least about 38 ksi and commonly no more than about 44 ksi, more commonly no more than about 43 ksi, and even more commonly no more than about 42 ksi. The after-bake ultimate tensile strength is commonly at least about 36 ksi, more commonly at least about 37 ksi and even more commonly at least about 38 ksi and commonly no more than about 44 ksi, more commonly no more than about 43 ksi, and even more commonly no more than about 42 ksi. The sheet commonly has an after-bake elongation of more than about 2%, more commonly at least about 2.5%, more commonly at least about 3%, more commonly at least about 3.5%, and even more commonly at least about 4% but commonly not more than about 7% and even more commonly not more than about 6%. The elongation typically ranges from about 4% to about 6%. Further, container bodies fabricated from the alloy of the present disclosure have a minimum dome reversal strength of at least about 90 psi and more commonly at least about 95 psi at current commercial thickness.

A number of variations and modifications of the disclosure can be used. It would be possible to provide for some features of the disclosure without providing others.

The present disclosure, in various aspects, embodiments, and configurations, includes components, methods, processes, systems and/or apparatus substantially as depicted and described herein, including various aspects, embodiments, configurations, subcombinations, and subsets thereof. Those of skill in the art will understand how to make and use the various aspects, aspects, embodiments, and configurations, after understanding the present disclosure. The present disclosure, in various aspects, embodiments, and configurations, includes providing devices and processes in the absence of items not depicted and/or described herein or in various aspects, embodiments, and configurations hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more, aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed aspects, embodiments, and configurations. Thus, the following claims are hereby incorporated into this Detailed Description, with each claim standing on its own as a separate common embodiment of the disclosure. Moreover, though the description of the disclosure has included description of one or more aspects, embodiments, or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A method, consisting of forming a melt composition comprising from 0.45 wt. % to 0.95 wt. % manganese, 1.3 wt. % to 1.95 wt. % magnesium, 0.1 wt. % to 0.5 wt. % copper, 0.2 wt. % to 0.7 wt. % iron, and 0.1 wt. % to 0.5 wt. % silicon, at least part of the melt composition is derived from scrap, wherein the melt composition comprises aluminum prime, and wherein the balance of the melt composition consists essentially of aluminum and incidental additional materials and impurities;

forming the melt composition into a cast strip having a cast temperature exceeding a recrystallization of an alloy formed from the melt composition, the cast strip comprising from 0.7 to 0.9 wt. % manganese, and from 1.55 to 1.65 wt. % magnesium;

hot rolling the cast strip to form a hot rolled cast strip having a thickness that is less than a thickness of the cast strip and a gauge ranging from 0.06 to 0.12 inches;

after hot rolling, hot mill annealing the hot rolled cast strip to form an annealed hot rolled cast strip, a minimum temperature of the hot mill annealing being 725 degrees Fahrenheit and a maximum temperature being 900 degrees Fahrenheit;

cooling the annealed hot rolled cast strip to a temperature less than a recrystallization temperature of the hot rolled cast strip to form a cooled cast strip;

cold rolling the cooled cast strip to form a first cold rolled cast strip having a gauge ranging from 0.020 to 0.04 inches, wherein a reduction in thickness of the hot rolled cast strip in the first cold rolling is less than 73% to be below a level required for the first cold rolled cast strip to realize a full hard state;

intermediate annealing the first cold rolled cast strip at a minimum temperature of 710 degrees Fahrenheit and a maximum temperature of 850 degrees Fahrenheit to form an intermediate annealed first cold rolled cast strip;

cooling the intermediate annealed first cold rolled cast strip to a temperature less than a recrystallization temperature of the intermediate annealed first cold rolled cast strip;

cold rolling the cooled intermediate first cold rolled annealed strip to form a second cold rolled cast strip, the second cold rolled cast strip being fully cold rolled and having a finished gauge ranging from 0.009 to 0.013 inches, wherein a reduction in thickness of the intermediate annealed first cold rolled cast strip in the second cold rolling is less than 73% to be below a level required for the second cold rolled cast strip to realize a full hard state; and before the second cold rolled cast strip is fabricated into a drawn and ironed container body for a beverage container, stabilize annealing the second cold rolled cast strip at a minimum temperature of 300 degrees Fahrenheit and a maximum temperature of 500 degrees Fahrenheit to form a stabilize annealed strip, wherein the stabilize annealed strip has a final yield strength of no more than 39 ksi, a final tensile strength of no more than 43 ksi, a final elongation of no more than 6%, a minimum dome reversal strength of at least 90 psi, and a column strength of at least 230 psi.

2. The method of claim 1, wherein the second cold rolled cast strip comprises a minimum of at least 0.75 wt. % manganese, at least 1.55 wt. % magnesium, at least 0.2 wt. % copper, at least 0.28 wt. % iron, and at least 0.1 wt. % silicon.

3. The method of claim 2, wherein the second cold rolled cast strip comprises a minimum of at least 0.85 wt. % manganese, at least 0.25 wt. % copper, at least 0.30 wt. % iron, and at least 0.15 wt. % silicon.

4. The method of claim 3, wherein the second cold rolled cast strip comprises a minimum of at least 0.85 wt. % manganese, at least 0.3 wt. % copper, at least 0.32 wt. % iron, and at least 0.3 wt. % silicon.

5. The method of claim 1, wherein the second cold rolled cast strip comprises a minimum of at least 0.75 wt. % manganese, at least 0.3 wt. % copper, at least 0.32 wt. % iron, and at least 0.3 wt. % silicon and a maximum of at most 0.5 wt. % copper, at most 0.45 wt. % iron, and at most 0.3 wt. % silicon, wherein the intermediate annealed first cold rolled strip is cooled by quenching and/or a nitrogen purge, wherein an output nozzle tip size of a continuous caster forming the cast strip is from 10 to 25 mm, wherein a gauge of the annealed hot rolled strip ranges from 0.085 to 0.11 inches, wherein a gauge of the first cold rolled strip is reduced in total relative to the gauge of the annealed hot rolled strip by less than 65% to maintain the first cold rolled strip below a reduction level to realize full hard conditions, and wherein a gauge of the second cold rolled strip is reduced in total relative to the gauge of the first cold rolled cast strip by less than 70% to maintain the second cold rolled strip below a reduction level to realize full hard conditions.

6. The method of claim 5, wherein the gauge of the first cold rolled cast strip is reduced in thickness relative the gauge of the annealed hot rolled cast strip by less than 60%, and wherein the gauge of the second cold rolled cast strip is reduced in thickness relative to the gauge of the first cold rolled cast strip by no more than 65%.

7. The method of claim 6, wherein at least 75% of the melt composition is derived from scrap, wherein the melt composition comprises no more than 25 wt. % prime aluminum, wherein the reduction level between the annealing steps is no more than 73%, wherein the scrap comprises used beverage containers, wherein the melt composition comprises at least 0.50 wt. % manganese, at least 1.40 wt. % magnesium, at least 0.15 wt. % copper, at least 0.3 wt. % iron, and at least 0.15 wt. % silicon, wherein the melt composition comprises no more than 20 wt. % prime aluminum, wherein the incidental additional materials and impurities is limited to 0.05 wt. % but not more than each additional material and impurity but the sum total of all incidental materials and impurities does not exceed 0.15 wt. % of the melt composition.

8. The method of claim 7, wherein at least 80% of the melt composition is derived from scrap, wherein the scrap comprises used beverage containers, wherein the melt composition comprises at least 0.50 wt. % but no more than 0.95 wt. % manganese, at least 1.25 wt. % but no more than 1.8 wt. % magnesium, at least 0.15 wt. % but no more than 0.4 wt. % copper, at least 0.2 wt. % but no more than 0.7 wt. % iron, and at least 0.15 wt. % but no more than 0.5 wt. % silicon, wherein the melt composition comprises no more than 15 wt. % prime aluminum, and wherein the incidental additional materials and impurities is limited to 0.03 wt. % but not more than each additional material and impurity but the sum total of all incidental materials and impurities do not exceed 0.1 wt. % of the melt composition.

9. The method of claim 8, wherein the cast strip is heated after forming the cast strip and before hot rolling, wherein at least 85% of the melt composition is derived from scrap, wherein the reduction level necessary to realize the full hard condition is 73% or higher, wherein the balance of the melt composition is derived from used beverage containers, wherein the melt composition comprises at least 0.50 wt. % but no more than 0.95 wt. % manganese, at least 1.3 wt. % but no more than 1.95 wt. % magnesium, at least 0.15 wt. % but no more than 0.4 wt. % copper, at least 0.2 wt. % but no more than 0.67 wt. % iron, and at least 0.15 wt. % but no more than 0.45 wt. % silicon, wherein the melt composition comprises no more than 10 wt. % prime aluminum, and wherein the incidental additional materials and impurities is limited to 0.01 wt. % but not more than each additional material and impurity but the sum total of all incidental materials and impurities does not exceed 0.1 wt. % of the melt composition.

10. The method of claim 9, wherein the intermediate annealed first cold rolled strip is cooled by quenching, wherein at least 90% of the melt composition is derived from scrap, wherein the scrap comprises used beverage containers, wherein the melt composition comprises at least 0.50 wt. % but no more than 0.80 wt. % manganese, at least 1.4 wt. % but no more than 1.9 wt. % magnesium, at least 0.15 wt. % but no more than 0.3 wt. % copper, and at least 0.2 wt. % but no more than 0.5 wt. % iron, wherein the melt composition comprises no more than 5 wt. % prime aluminum, wherein the sum total of all incidental materials and impurities does not exceed 0.05 wt. % of the melt composition.

11. The method of claim 10, wherein the scrap comprises used beverage containers, wherein the melt composition comprises at least 0.50 wt. % but no more than 0.70 wt. % manganese and at least 1.4 wt. % but no more than 1.8 wt. % magnesium, wherein, in the intermediate annealing, the first cold rolled strip is heat soak annealed at a temperature between a minimum temperature of 720 degrees Fahrenheit and a maximum temperature of 800 degrees Fahrenheit, and wherein, in the stabilize annealing, the second cold rolled strip is heated by a batch heater to a temperature between a minimum temperature of 325 degrees Fahrenheit and a maximum temperature of 450 degrees Fahrenheit, wherein the stabilize annealed strip is body stock, and wherein the stabilized annealed strip has a final yield strength of at least 32 ksi but no more than 43 ksi, a final tensile strength of at least 38 ksi but no more than 43 ksi, a final elongation of at least 3% but no more than 6%, and a tested earing of no more than 1.0%.

12. The method of claim 10, wherein the cold rolling to the first cold rolled cast strip gauge is performed in one to two cold mill passes, wherein, in the intermediate annealing, the first cold rolled cast strip is heated to a temperature between a minimum temperature of 720 degrees Fahrenheit and a maximum temperature of 800 degrees Fahrenheit, wherein, in the stabilize annealing, the second cold rolled cast strip is heated by a continuous heater to a temperature between a minimum temperature of 325 degrees Fahrenheit and a maximum temperature of 400 degrees Fahrenheit, wherein the stabilize annealed strip is body stock, and wherein the stabilize annealed strip has a final yield strength of at least 32 ksi but no more than 39 ksi, a final tensile strength of at least 38 ksi but no more than 43 ksi, a final elongation of at least 3% but no more than 6%, and a tested earing of no more than 1.5%.

13. The method of claim 12, wherein the cast strip comprises a minimum of at least 0.2 wt. % copper, at least 0.28 wt. % iron, and at least 0.1 wt. % silicon and further comprising after hot rolling, hot mill annealing the hot rolled strip, a minimum temperature of the hot mill annealing being 775 degrees Fahrenheit and a maximum temperature being 850 degrees Fahrenheit.

14. The method of claim 13, wherein the cast strip comprises a minimum of at least 0.75 wt. % manganese, at least 1.55 wt. % magnesium, at least 0.25 wt. % copper, at least 0.30 wt. % iron, and at least 0.15 wt. % silicon and wherein the first cold rolled strip has a gauge ranging from 0.025 to 0.045 inches.

15. The method of claim 14, wherein the cast strip comprises a minimum of at least 0.8 wt. % manganese, at least 0.3 wt. % copper, at least 0.32 wt. % iron, and at least 0.3 wt. % silicon.

16. The method of claim 15, wherein the cast strip comprises a minimum of at least 0.85 wt. % manganese, at least 1.55 wt. % magnesium, at least 0.3 wt. % copper, at least 0.32 wt. % iron, and at least 0.3 wt. % silicon and a maximum of at most 0.5 wt. % copper, at most 0.45 wt. % iron, and at most 0.3 wt. % silicon and further comprising:
after intermediate annealing and before cold rolling of the first intermediate annealed first cold rolled strip;
cold rolling the intermediate annealed first cold rolled strip to form an intermediate cold rolled strip having a gauge ranging from 0.015 to 0.040 inches, wherein the reduction in thickness is no more than 71%;
further intermediate annealing the intermediate cold rolled strip at a temperature ranging from 600 to 1,050 degrees Fahrenheit to form a further intermediate annealed first cold rolled strip and wherein the cold rolling of the intermediate annealed first cold rolled strip cold rolls the further intermediate annealed first cold rolled strip.

17. The method of claim 13, wherein the gauge of the first cold rolled strip is reduced in thickness relative the gauge of the annealed hot rolled strip by less than 60%, and wherein the gauge of the second cold rolled strip is reduced in thickness relative to the gauge of the first cold rolled strip by no more than 70%.

18. The method of claim 10, wherein, in the intermediate annealing, the first cold rolled cast strip is heated to a temperature between a minimum temperature of 720 degrees Fahrenheit and a maximum temperature of 800 degrees Fahrenheit, wherein, in the stabilize annealing, the second cold rolled cast strip is heated to a temperature between a minimum temperature of 325 degrees Fahrenheit and a maximum temperature of 450 degrees Fahrenheit, and wherein the stabilize annealed strip is a component of a beverage container, the beverage container comprising a can end, can tab, and can body.

19. The method of claim 10, further comprising forming the stabilize annealed strip into an article, wherein, in the intermediate annealing, the first cold rolled cast strip is heated to a temperature between a minimum temperature of 720 degrees Fahrenheit and a maximum temperature of 800 degrees Fahrenheit, wherein, in the stabilize annealing, the second cold rolled cast strip is heated to a temperature between a minimum temperature of 325 degrees Fahrenheit and a maximum temperature of 450 degrees Fahrenheit and wherein the article has a final yield strength of at least 32 ksi but no more than 39 ksi, a final tensile strength of at least 8 ksi but no more than 43 ksi, a final elongation of at least 3% but no more than 6%, and a tested earing of no more than 1.5%.

20. A method for forming can body stock, comprising
forming a melt composition comprising from 0.45 wt. % to 0.95 wt. % manganese, 1.3 wt. % to 1.95 wt. % magnesium, 0.10 wt. % to 0.5 wt. % copper, 0.2 wt. % to 0.7 wt. % iron, and 0.1 wt. % to 0.5 wt. % silicon, at least part of the melt composition is derived from scrap, wherein the melt composition comprises aluminum prime, and wherein the balance of the melt composition consists essentially of aluminum and incidental additional materials and impurities;

continuously casting the melt composition into a cast strip having a cast temperature exceeding a recrystallization of an alloy formed from the melt composition, wherein the cast strip comprises from 0.7 to 0.9 wt. % manganese and at least 1.55 wt. % magnesium;

hot rolling the cast strip to form a hot rolled strip having a thickness that is less than a thickness of the cast strip and a gauge ranging from 0.06 to 0.12 inches; and after hot rolling, hot mill annealing the hot rolled strip, a minimum temperature of the hot mill annealing being 725 degrees Fahrenheit and a maximum temperature being 800 degrees Fahrenheit;

wherein further gauge reduction and thermal treatment of the annealed hot rolled strip to form an annealed hot rolled strip consists of:

after cooling the annealed hot rolled strip to a temperature less than a recrystallization temperature of the hot rolled strip, cold rolling the cooled annealed hot rolled strip to form a first cold rolled strip having a gauge ranging from 0.020 to 0.04 inches, wherein a reduction in thickness of the hot rolled strip in the first cold rolling is less than 73% to inhibit the first cold rolled strip from being in a full hard state;

intermediate annealing the first cold rolled strip at a minimum temperature of 710 degrees Fahrenheit and a maximum temperature of 850 degrees Fahrenheit to form an intermediate annealed first cold rolled strip;

after cooling the intermediate annealed first cold rolled strip to a temperature below a recrystallization temperature of the intermediate annealed first cold rolled strip, cold rolling the cooled intermediate annealed first cold rolled strip, intermediate first cold rolled annealed strip to form a second cold rolled strip, the second cold rolled strip being fully cold rolled and having a finished gauge ranging from 0.005 to 0.013 inches, wherein a reduction in thickness of the intermediate annealed first cold rolled strip in the second cold rolling is less than 73% to inhibit the second cold rolled strip from being in a full hard state; and before the second cold rolled strip is fabricated into a drawn and ironed container body for a beverage container, stabilize annealing the second cold rolled strip at a minimum temperature of 300 and a maximum temperature of 500 degrees Fahrenheit to form a stabilize annealed strip, wherein the stabilize annealed strip has a final yield strength of no more than 39 ksi, a final tensile strength of no more than 43 ksi, a final elongation of no more than 6%, a minimum dome reversal strength of at least 90 psi, and a column strength of at least 230 psi.

21. The method of claim 20, wherein the cast strip comprises a minimum of at least 0.75 wt. % manganese, at least 0.2 wt. % copper, at least 0.28 wt. % iron, and at least 0.1 wt. % silicon.

22. The method of claim 21, wherein the cast strip comprises a minimum of at least 0.8 wt. % manganese, at least 0.25 wt. % copper, at least 0.30 wt. % iron, and at least 0.15 wt. % silicon.

23. The method of claim 22, wherein the cast strip comprises a minimum of at least 0.85 wt. % manganese, at least 0.3 wt. % copper, at least 0.32 wt. % iron, and at least 0.3 wt. % silicon.

24. The method of claim 21, wherein the gauge of the first cold rolled strip is reduced in thickness relative the gauge of the annealed hot rolled strip by less than 60%, and wherein the gauge of the second cold rolled strip is reduced in thickness relative to the gauge of the first cold rolled strip by no more than 65%, and wherein the first cold rolled strip has a gauge ranging from 0.025 to 0.045 inches.

25. The method of claim 20, wherein the cast strip comprises a minimum of at least 0.75 wt. % manganese, at least 0.3 wt. % copper, at least 0.32 wt. % iron, and at least 0.3 wt. % silicon and a maximum of at most 0.5 wt. % copper, at most 0.45 wt. % iron, and at most 0.3 wt. % silicon, wherein the intermediate annealed first cold rolled strip is cooled by quenching and/or a nitrogen purge, wherein an output nozzle tip size of a continuous caster forming the cast strip is from 10 to 25 mm, wherein a gauge of the annealed hot rolled strip ranges from 0.085 to 0.12 inches, wherein a gauge of the first cold rolled strip is reduced in total relative to the gauge of the annealed hot rolled strip by less than 65% to maintain the first cold rolled strip below a reduction level to realize full hard conditions, and wherein a gauge of the second cold rolled strip is reduced in total relative to the gauge of the first cold rolled strip by less than 70% to maintain the second cold rolled strip below a reduction level to realize full hard conditions.

26. A method for forming can body stock, comprising
forming a melt composition comprising from 0.45 wt. % to 0.95 wt. % manganese, 1.3 wt. % to 1.95 wt. % magnesium, 0.10 wt. % to 0.5 wt. % copper, 0.2 wt. % to 0.7 wt. % iron, and 0.1 wt. % to 0.5 wt. % silicon, at least part of the melt composition is derived from scrap, wherein the melt composition comprises aluminum prime, and wherein the balance of the melt composition consists essentially of aluminum and incidental additional materials and impurities;

continuously casting the melt composition into a cast strip having a gauge ranging from 0.50 to 0.95 inches and a cast temperature exceeding a recrystallization of an alloy formed from the melt composition, wherein the cast strip comprises a minimum of at least 0.7 wt. % and a maximum of no more than 0.9 wt. % manganese and at least 1.54 wt. % magnesium;

hot rolling the cast strip to form a hot rolled strip having a thickness that is less than a thickness of the cast strip and a gauge ranging from 0.06 to 0.14 inches;

cold rolling, at a temperature less than a recrystallization temperature of the hot rolled strip, the hot rolled strip to form a first cold rolled strip having a gauge ranging from 0.020 to 0.055 inches, wherein a reduction in thickness of the hot rolled strip in the first cold rolling is less than 65% such that the first cold rolled strip is free from a full hard state;

intermediate annealing the first cold rolled strip at a minimum temperature of 650 degrees Fahrenheit and a maximum temperature of 750 degrees Fahrenheit to form an intermediate annealed first cold rolled strip;

cold rolling, at a temperature less than a recrystallization temperature of the intermediate annealed first cold rolled strip, the intermediate annealed first cold rolled annealed strip to form a second cold rolled strip, the second cold rolled strip being fully cold rolled and having a finished gauge ranging from 0.010 to 0.014 inches, wherein a reduction in thickness of the intermediate annealed first cold rolled strip in the second cold rolling is no more than 70% such that the second cold rolled strip is free from a full hard state; and before the second cold rolled strip is fabricated into a drawn and ironed container body for a beverage container, stabilize annealing the second cold rolled strip at a minimum temperature of 293 and a maximum temperature of 500 degrees Fahrenheit to form a stabilize annealed strip, wherein the stabilize annealed strip has an as rolled yield strength of no more than 38.5 ksi, an after-bake yield strength of not greater than 38.5 ksi, as rolled ultimate tensile strength of no more than 43 ksi, an after bake ultimate tensile strength of more than 43 ksi, an after-bake elongation ranging from 4 to 6%, and a minimum dome reversal strength of at least 90 psi.

27. The method of claim 26, wherein the intermediate annealed first cold rolled strip is cooled by quenching and/or a nitrogen purge, wherein an output nozzle tip size of a continuous caster forming the cast strip is from 10 to 25 mm, wherein a gauge of the hot rolled strip ranges from 0.06 to 0.12 inches, wherein a gauge of the first cold rolled strip ranges from 0.025 to 0.045 inches and is reduced in total relative to the gauge of the hot rolled strip by less than 65% to maintain the first cold rolled strip below a reduction level to realize full hard conditions, and wherein a gauge of the second cold rolled strip ranges from 0.010 to 0.014 inches and is reduced in total relative to the gauge of the first cold rolled strip by less than 71% to maintain the second cold rolled strip below a reduction level to realize full hard conditions.

* * * * *